US011461977B2

(12) United States Patent
Schwarz et al.

(10) Patent No.: US 11,461,977 B2
(45) Date of Patent: Oct. 4, 2022

(54) CONTROLLER WITH REEL(S) AND/OR OTHER MECHANISM(S) FOR SIMULATING FORCE INDICATED IN AUGMENTED OR VIRTUAL REALITY CONTENT

(71) Applicant: Lenovo (Singapore) Pte. Ltd., Singapore (SG)

(72) Inventors: David Alexander Schwarz, Morrisville, NC (US); John Weldon Nicholson, Cary, NC (US); Ming Qian, Cary, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 413 days.

(21) Appl. No.: 16/554,567

(22) Filed: Aug. 28, 2019

(65) Prior Publication Data
US 2021/0065449 A1     Mar. 4, 2021

(51) Int. Cl.
| *G06T 19/00* | (2011.01) |
| *G06F 1/16* | (2006.01) |
| *H04B 1/38* | (2015.01) |
| *G01L 1/22* | (2006.01) |
| *G06F 3/01* | (2006.01) |

(52) U.S. Cl.
CPC .......... *G06T 19/006* (2013.01); *G01L 1/2231* (2013.01); *G06F 1/163* (2013.01); *G06F 3/011* (2013.01); *G06F 3/016* (2013.01); *H04B 1/38* (2013.01); *G06F 2203/013* (2013.01); *G06F 2203/014* (2013.01)

(58) Field of Classification Search
CPC ............... G06F 2111/18; G06F 3/0481; G06F 3/04817; G06F 9/4443; G06F 3/04847; G06F 11/3664; G06F 3/012; G06F 3/0304; G06F 3/011–015; G06K 9/00664–00704; G06T 19/00; G06T 17/00; G06T 7/00; G06T 19/006; G06T 2215/16; H04N 5/272; H04N 2201/3245; A63F 13/10
See application file for complete search history.

(56) References Cited

U.S. PATENT DOCUMENTS

| 6,226,933 | B1 * | 5/2001 | Nelson .................... E04H 12/20 43/124 |
| 10,826,553 | B1 * | 11/2020 | Duran ....................... A45F 5/00 |
| 2019/0354183 | A1 * | 11/2019 | Swindells ............... A63F 13/21 |
| 2019/0391647 | A1 * | 12/2019 | Rihn ........................ G06F 3/016 |
| 2020/0368616 | A1 * | 11/2020 | Delamont ............. A63F 13/213 |
| 2021/0065449 | A1 * | 3/2021 | Schwarz ............... G01L 1/2231 |

* cited by examiner

*Primary Examiner* — Todd Buttram
(74) *Attorney, Agent, or Firm* — John M. Rogitz; John L. Rogitz

(57) ABSTRACT

In one aspect, a controller for engaging with augmented reality (AR) content and/or virtual reality (VR) content includes a housing and a wrist strap engageable with the housing. The controller also includes at least one reel engageable with the housing and the wrist strap to move the housing relative to the wrist strap while the wrist strap is worn by a person to simulate force indicated in the AR or VR content.

20 Claims, 9 Drawing Sheets

US 11,461,977 B2

CONTROLLER WITH REEL(S) AND/OR OTHER MECHANISM(S) FOR SIMULATING FORCE INDICATED IN AUGMENTED OR VIRTUAL REALITY CONTENT

FIELD

The present application relates to technically inventive, non-routine solutions that are necessarily rooted in computer technology and that produce concrete technical improvements.

BACKGROUND

As recognized herein, electronic controllers may be used for engaging with augmented reality (AR) content or virtual reality (VR) content. However, current controllers can only provide limited (if any) simulations of force indicated in the AR or VR content by using vibration in their attempts to make the AR or VR experience feel more realistic to the user. The present application recognizes that this leaves much to be desired and fails to adequately provide AR or VR systems with tools to make the AR or VR experience sufficiently realistic and immersive. There are currently no adequate solutions to the foregoing computer-related, technological problem.

SUMMARY

Accordingly, in one aspect at least one controller includes a housing, a wrist strap engageable with the housing, and at least one reel engageable with the housing and the wrist strap to move the housing relative to the wrist strap while the wrist strap is worn by a person. The controller may be an augmented reality (AR) controller and/or a virtual reality (VR) controller.

In some implementations, the at least one controller may include at least first and second reels that may be engageable with the housing and the wrist strap to move the housing in different directions relative to the wrist strap while the wrist strap is worn by the person. In some examples, the first and second reels may be disposed on the wrist strap and they may be engageable with the housing via respective lines connecting the first and second reels to different parts of the housing. In other examples, the first and second reels may be disposed on the housing and they may be engageable with the wrist strap via respective lines connecting the first and second reels to different parts of the wrist strap.

Additionally, in some implementations the at least one controller may include first and second controllers, each with a respective housing, a respective wrist strap engageable with the respective housing, and a respective at least one reel engageable with the respective housing and the respective wrist strap to move the respective housing relative to the respective wrist strap while the respective wrist strap is worn by the person.

Still further, in some examples the at least one controller may include at least one motor and at least one battery, where the at least one motor may control the at least one reel using power from the at least one battery. The at least one controller may also include at least one processor and at least one wireless transceiver accessible to the at least one processor, where the at least one processor may receive commands via the wireless transceiver to rotate the at least one reel using the at least one motor.

In another aspect, a method includes receiving a command to rotate at least one reel of a controller device and rotating the at least one reel of the controller device in conformance with the command.

In some implementations, the method may include generating the command at a computer different from the controller device and transmitting the command to the controller device. Additionally, in some implementations the method may include, concurrent with the rotating of the at least one reel, presenting images on a display that correspond to the rotating of the at least one reel.

In some examples, the controller device may include first and second reels and the method may include receiving a command to rotate both the first and second reels concurrently and then rotating the first and second reels concurrently in conformance with the command.

Also in some examples, the command may be a first command, the first command may indicate reel rotation at a first speed and/or of a first amount, and the first command may be received in a first instance. The method may then include receiving, in a second instance subsequent to the first instance, a second command to rotate the at least one reel at a second speed different from the first speed and/or to rotate the at least one reel by a second amount different from the first amount. The method may then include rotating the at least one reel of the controller device in conformance with the second command.

In another aspect, a system includes a controller useful for a person to engage with augmented reality (AR) content and/or virtual reality (VR) content. The controller includes a hand-held housing and a wrist strap. The controller also includes at least one mechanism for simulating force indicated in the AR content and/or VR content via at least one connector that connects the hand-held housing to the wrist strap.

The at least one mechanism may include at least one reel engaged with the connector. Additionally or alternatively, the at least one mechanism may include at least one piston engaged with the connector.

Still further, in some examples the system may also include a computer with system components to present the AR content and/or VR content in accordance with force generated using the mechanism.

The details of present principles, both as to their structure and operation, can best be understood in reference to the accompanying drawings, in which like reference numerals refer to like parts, and in which:

DETAILED DESCRIPTION

Figure 1:
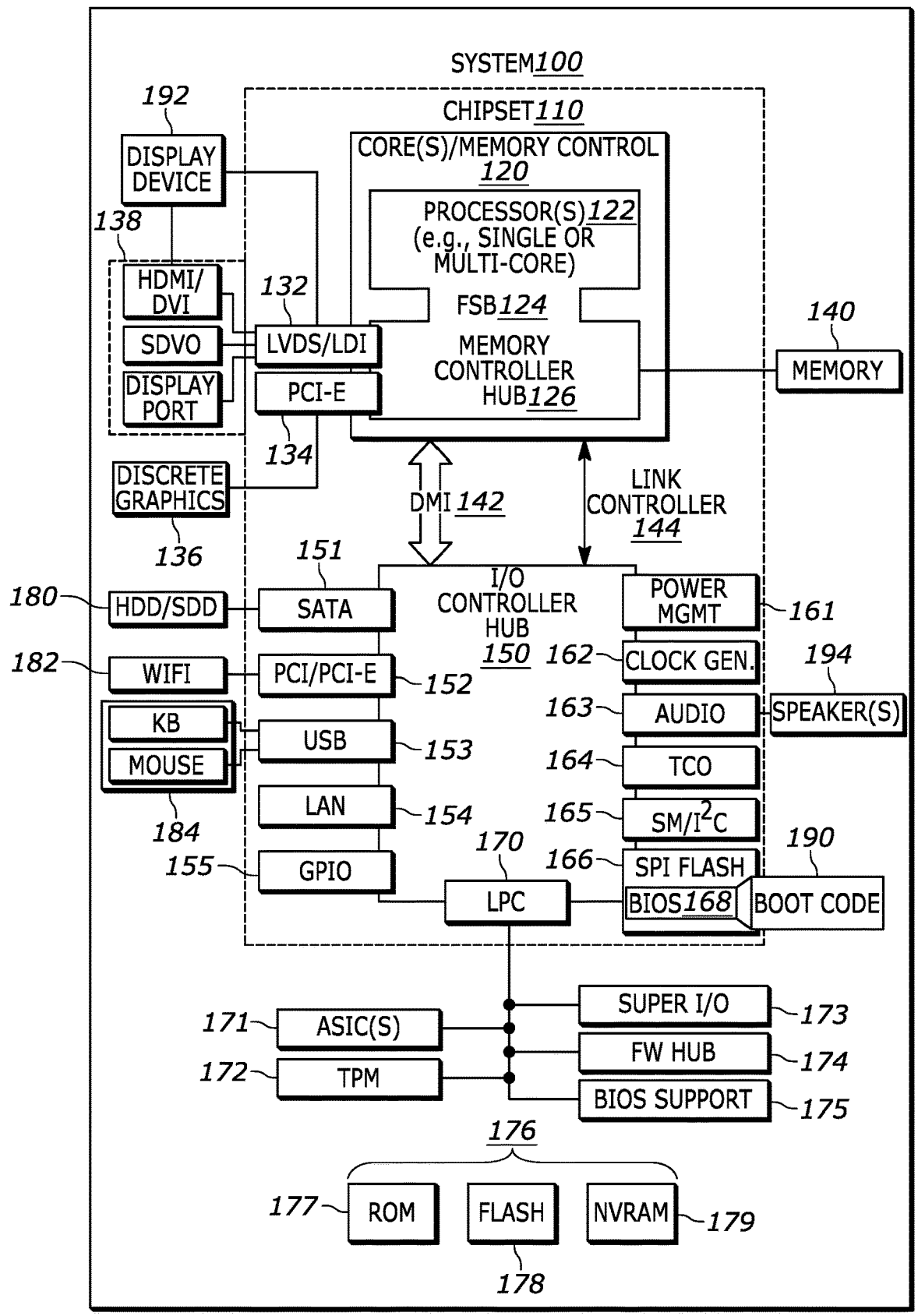
FIG. 1 is a block diagram of an example system in accordance with present principles.

The present application discloses hardware mechanisms and software for use with augmented reality (AR) and virtual reality (VR) content, with it being noted that present principles may apply to controller use for still other types of content as well such as more-traditional video game content presented on a television non-stereoscopicly. Consistent with present principles, the reels of a wand-like controller may be commanded to generate, for example, push and pull haptics to mimic the recoil of a gun, the banging of a sword against another sword, or even the pushing of a button on a wall. Thus, within the AR/VR simulation, the controllers may be represented by and visible in the simulation as weapons, levers, virtual arms and hands, bottles and still other sorts of physical objects and to simulate virtual forces in the AR/VR simulation.

Prior to delving into the details of the instant techniques, with respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, an at least partially transparent AR display or even a VR display for presenting stereoscopic images, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
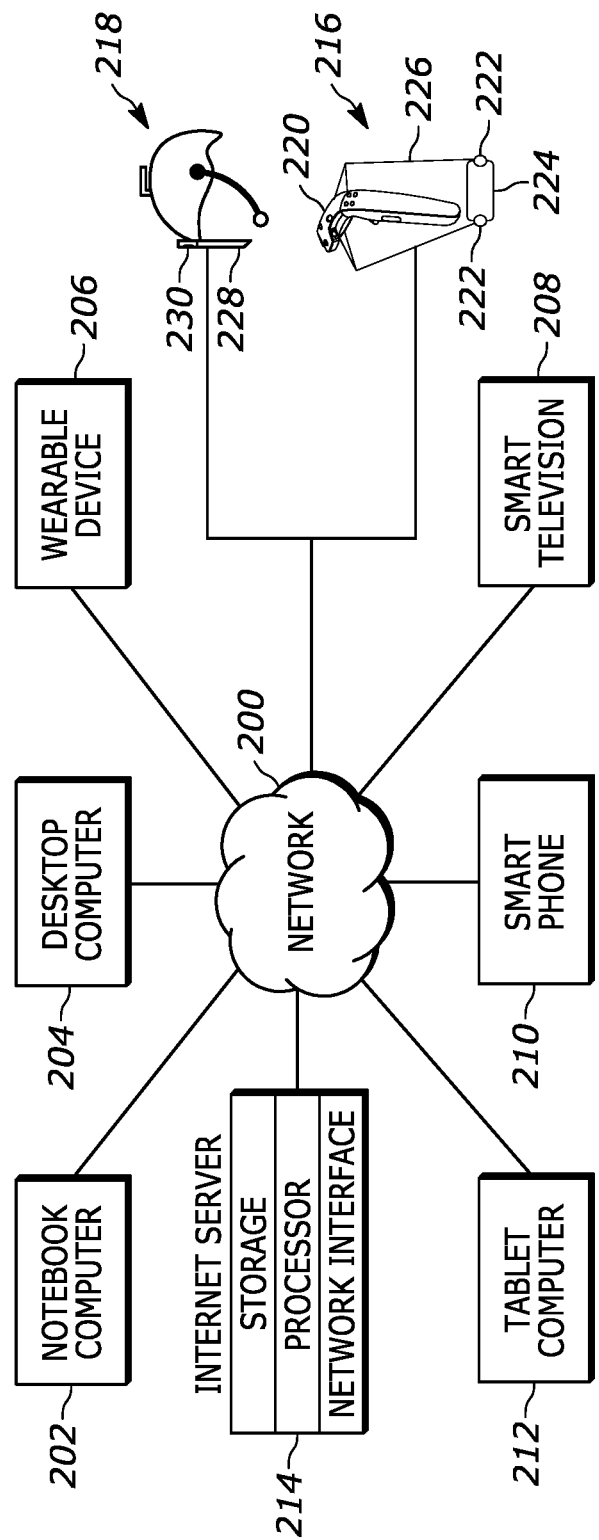
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, an AR/VR controller 216, an AR/VR headset 218, and a server 214 such as an Internet server that may provide cloud storage accessible to the devices 202-212, 216, 218. It is to be understood that the devices 202-218 are configured to communicate with each other over the network 200 to undertake present principles.

Describing the AR/VR controller 216 in more detail, it may include a hand-held housing 220 as well as one or more reels 222 on a wrist strap 224 connected to the housing 220 via one or more lines or connectors 226. Additional examples of AR/VR controllers consistent with present principles will be described below in reference to FIGS. 3-7.

Describing the AR/VR headset 218 in more detail, it may be a headset with one or more displays 228 for presenting visual AR and/or VR content thereon. Thus, the display 228 may be a display for presenting stereoscopic images to each eye of a wearer of the headset. The display 228 may therefore be an at least partially transparent heads-up display in AR examples, or may be a VR display in other examples that might not be transparent but that still might be capable of presenting AR content (in addition to VR content) based on AR processing and presentation of images from the wearer's environment from a camera 230 located on the headset 218. Furthermore, though not shown for simplicity, the AR headset 218 may include still other components in accordance with present principles, such as a speaker for presenting audio of AR and VR content, a network interface for communicating with a computer facilitating presentation of the AR or VR content (such as the computer 204) and for communicating with controllers such as the controller 216, cameras facing the wearer's eyes for eye tracking, etc.

FIGS. 3-7 show various example controllers for a user to engage with AR or VR content while also viewing visual aspects of the content on an AR or VR display consistent with present principles. It is to be understood that each of the controllers to be described below may include system components such as those described above in reference to the system 100 and controller 216, including motion trackers such as accelerometers and gyroscopes for sensing movement of the respective controller under control of a user while the user interacts with AR or VR content using the respective controller.

Figure 3:
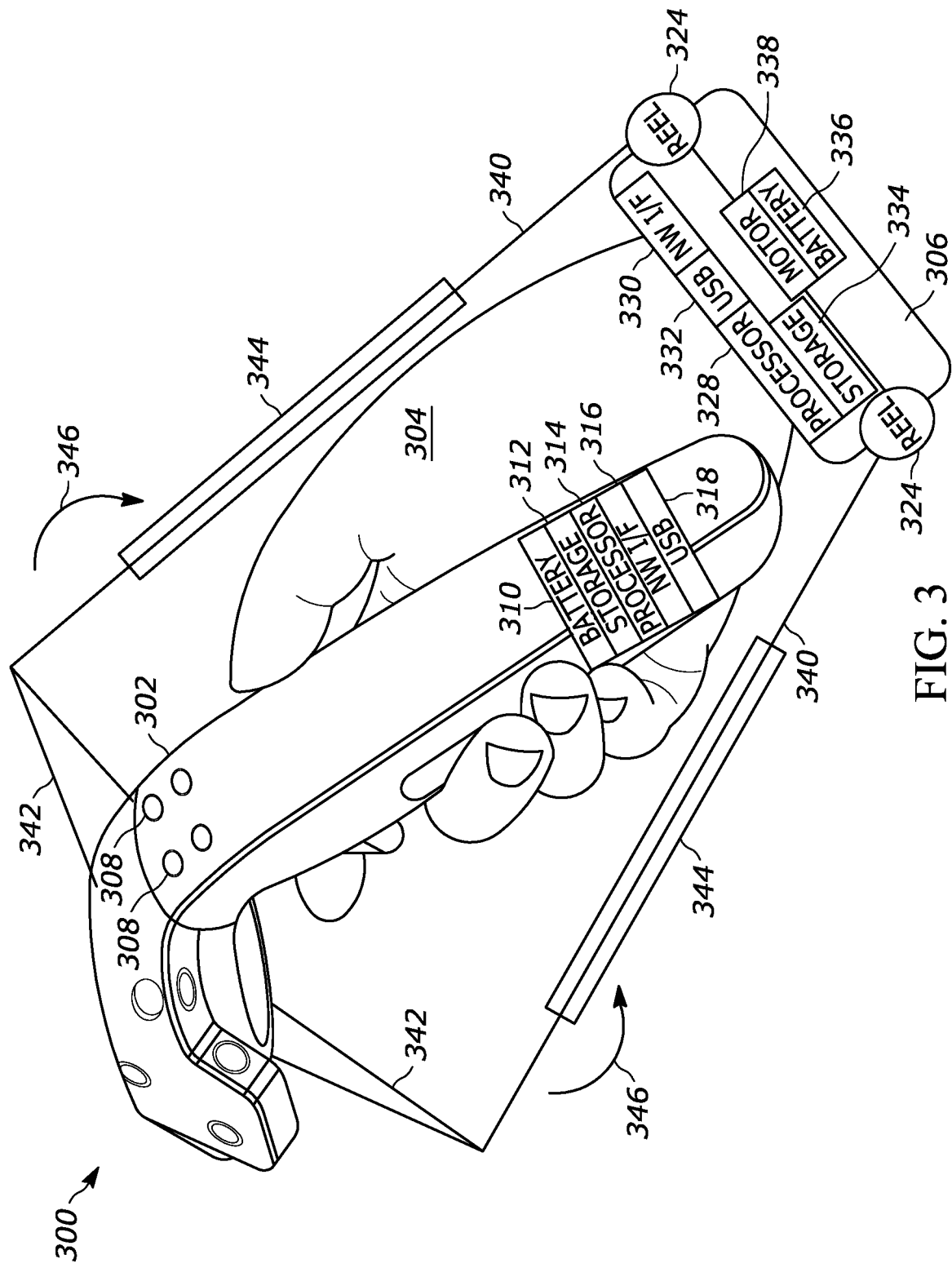

Beginning first with FIG. 3, a first example controller 300 is shown. The controller 300 may include a hand-held housing 302 holdable in a hand of a user 304 as shown, as well as a wrist strap 306 that may circumscribe a segment of a wrist of the user 304 as also shown. The controller 300 may also include one or more buttons 308 on the housing 302 for engaging with AR or VR content, such as for playing an AR or VR video game or interacting with an AR or VR environment. One or more system components may be disposed within the housing 302, such as a battery or battery pack 310 for powering other system components in the housing 302 as well as electronic components of the wrist strap 306 in some examples. Other system components that may be disposed within the housing 302 may include non-transitory storage 312 for storing software instructions and data for operation of the controller 300 under control of one or more processors 314 in accordance with present principles. The one or more processors 314 may also be configured to transmit signals indicating motion of the controller 300 that is detected by motion sensors of the controller 300, as well as signals indicating selections of one or more of the buttons 308, via a wireless network interface 316 and/or USB port 318 to a computer assisting with presentation of the AR or VR content (e.g., a video game console or other computer running the AR or VR simulation).

The processor 314 may also be configured to receive commands from that computer to control one or more reels 324 to effect movement of the housing 302 with respect to the wrist strap 306 when the housing 302 is held in the hand of the user 304 and the wrist strap is wrapped around the wrist of the user 304. Additionally or alternatively, a processor 328 disposed on the wrist strap itself may also be used for such purposes.

Thus, as also shown, the wrist strap 306 may include a wireless network interface 330 for communicating with the computer assisting with the presentation of the AR or VR content as well as for communicating with system components located within the controller housing 302, such as to receive commands to control the reels 324 to effect movement of the housing 302 with respect to the wrist strap 306. A USB port 332 for wired communication with the computer and/or system components of the housing 302 may also be used for such communication. Also note that non-transitory storage 334 may also be included on the wrist strap 306 for storing software instructions and data for operation of the controller 300 under control of the processors 314 and/or 328 in accordance with present principles (e.g., to help control the reels 324).

Still further, note that the wrist strap 306 may include a battery or battery pack 336 for powering a motor 338 that winds the reels 324 forwards and backwards consistent with present principles, and for powering other system components of the wrist strap 306 such as the processor 328, network interface 330, and USB port 332.

It is to be understood that each of the two reels 324 shown in this embodiment may be located on opposing sides of the wrist strap 306. Thus, in some examples the reels 324 may be located so that when the strap 306 is worn by the user 304 the reels 324 are located along respective sides of the wrist of the user 304, while in other examples the reels may be located on top and bottom surfaces of the wrist of the user 304 when the wrist strap 306 is worn. However, in other examples where four reels 324 are disposed on the strap 306 and connected to four respective anchors 342, a reel may be disposed along both sides of the wrist as well as at top and bottom surfaces of the wrist when the strap 306 is worn around the wrist.

Furthermore, note that each of the reels 324 may include a spool for winding a respective line or connector 340 around it under control of the motor 338 and also for unwinding the respective connector 340 from the spool. Thus, each respective connector 340 may be engaged with a respective reel 324 at one end and with a respective anchor 342 at another end. Each anchor 342 may be located toward or at a distal end of the housing 302 and may form an upside down "V" or A-frame as shown. A respective connector 340 may thus be mounted to the respective anchor 342 at its apex, though other configurations may also be used such as a single pole with an eye or mount at a distal end thereof for connecting to the respective connector 340.

Also note that in examples where two anchors 342 are used as shown, the anchors 342 may be located on opposing surfaces of the housing 302 at or toward its distal end, whether those surfaces are top and bottom surfaces or opposing side surfaces.

Additionally, it is to be understood that more reel 324/anchor 342 pairs may be used, such as three or four pairs with one-to-one correspondence between a respective reel 324 and a respective anchor 342 as connected by a respective connector 340. However, also note that in other embodiments the correspondence need not be one-to-one and, for example, a single reel 324 may be connected to plural anchors 342 after a portion of the connector 340 that generally does not get wound around the respective spool of the respective reel 324 splits into two or more segments to engage each respective anchor 342. Further, note that in still examples a single anchor 342 may be connected to plural reels 324 via different respective connectors 340 each mounted to that single anchor 342 but connecting to a different respective reel 324 via a respective connector 340.

As for the connectors 340 themselves, each respective connector 340 may have a plastic or rubber sleeve 344 circumscribing a longitudinal segment of the respective connector 340, though in some examples the sleeve 344 may extend the entire length of the connector 340 from the respective anchor 342 to another end connected at the reel 324. Furthermore, it is to be understood that each 340 connector may itself be composed of metal wire, silk, nylon, polyvinylidene fluoride, polyethylene, and/or another plastic or other suitable material.

Thus, as a respective spool inside a respective reel 324 winds, the housing 302 may move with respective to the wrist strap 306 as generally illustrated by respective arrows 346. Furthermore, as one of the reels 324 is wound, the other respective reel 324 may be unwound to allow a greater degree of rotation of the housing 302 with respect to the wrist strap 306.

FIGS. 4-7 show alternate configurations of a controller in accordance with present principles. It is to be understood that each of the controllers described below may include some or all of the same components as the controller 300 and may therefore be substantially similar in function and configuration as the controller 300, save for the differences noted below.

Figure 4:
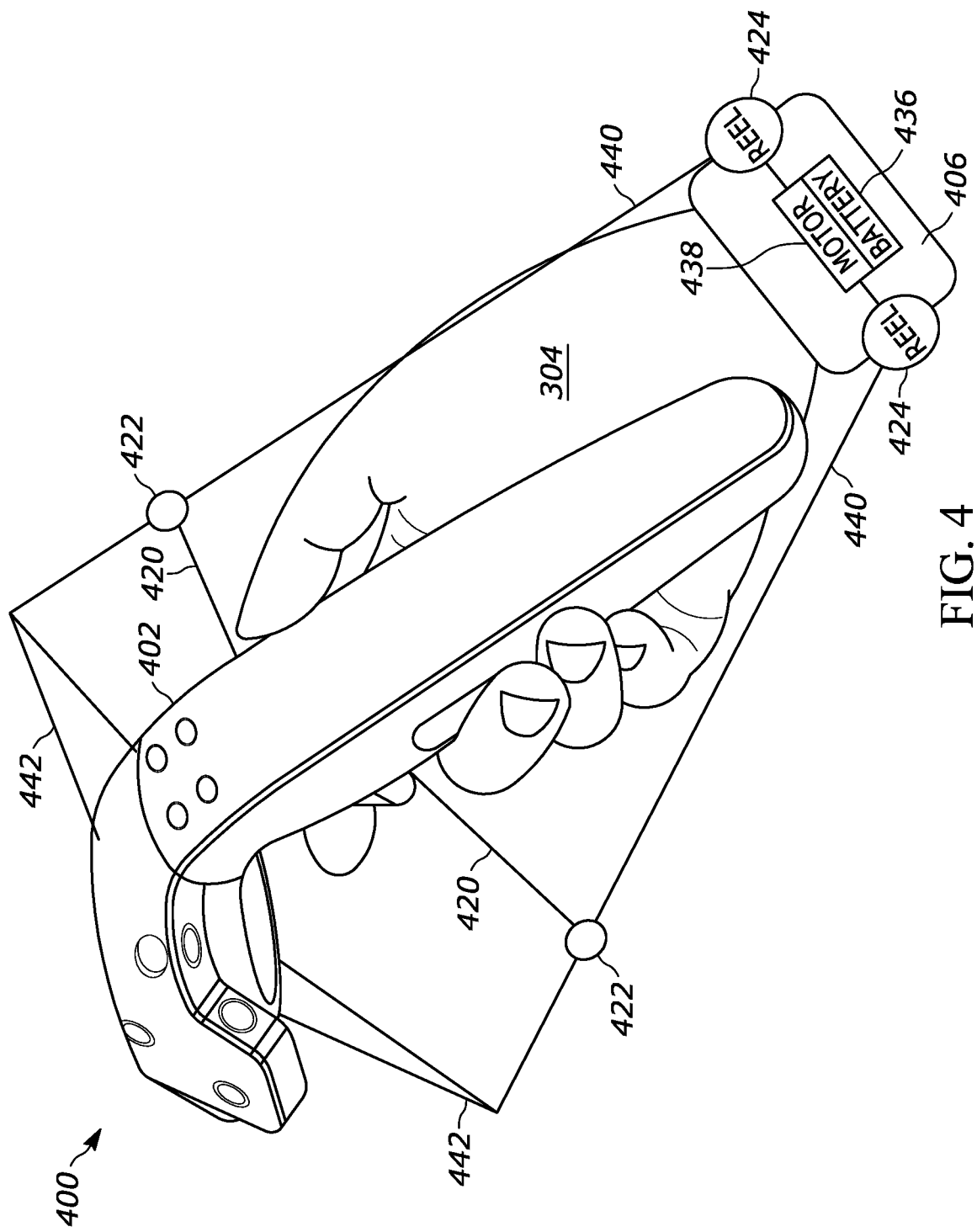
FIGS. 4-7 show various example controllers that may be used for a user to engage with augmented and/or virtual reality content consistent with present principles.

First describing FIG. 4, a controller 400 that has a hand-held housing 402 and wrist strap 406 is shown. The controller 400 may have respective reels 424 connected to respective anchors 442 via respective connectors 440 and that are controllable via a motor 438 powered by a battery 436. Differentiating from FIG. 3, in FIG. 4 at least one respective wire guide or post 420 may be mounted to the housing 402 and extend away from the housing 420 to a distal end that may include a respective eyelet 422 through which a respective connector 440 may extend as shown. The wire guides 420 may help avoid contact between the connectors 440 and hand or wrist portions of the user 304, thereby helping to prevent interference as the reels 424 are wound and unwound.

Figure 5:
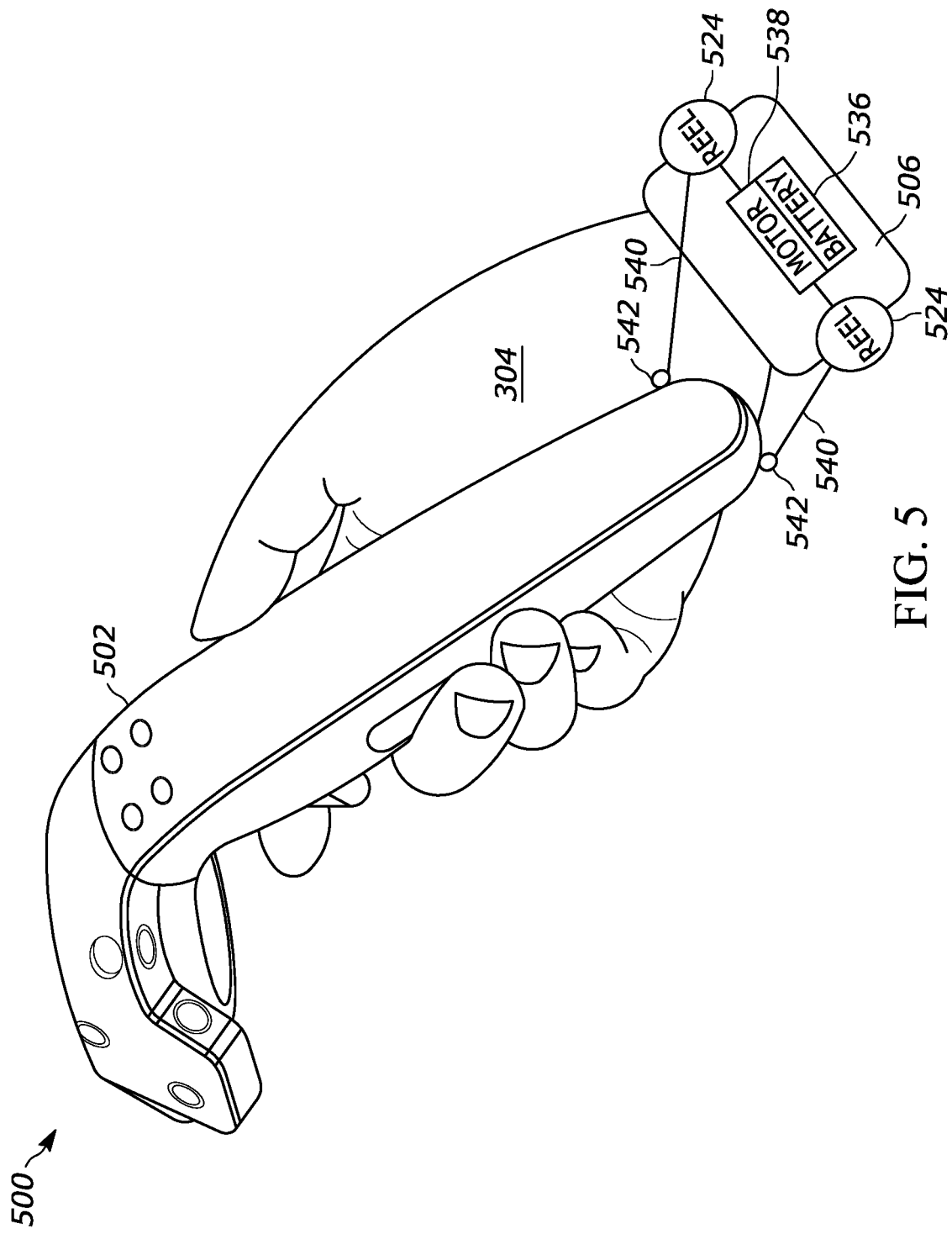

Reference is now made to FIG. 5. This figure shows a controller 500 having a hand-held housing 502 and wrist strap 506. Like the wrist straps described above, the strap 506 may include both a motor 538 and battery 536 for powering the motor 538. Also like the figures above, respective reels 524 may be mounted on the strap 506 and be engaged with a respective connector 540. However, differentiating FIG. 5, here respective anchors 542 may be mounted at or toward a proximal end of the housing 502 rather than a distal end as in the examples above.

Figure 6:
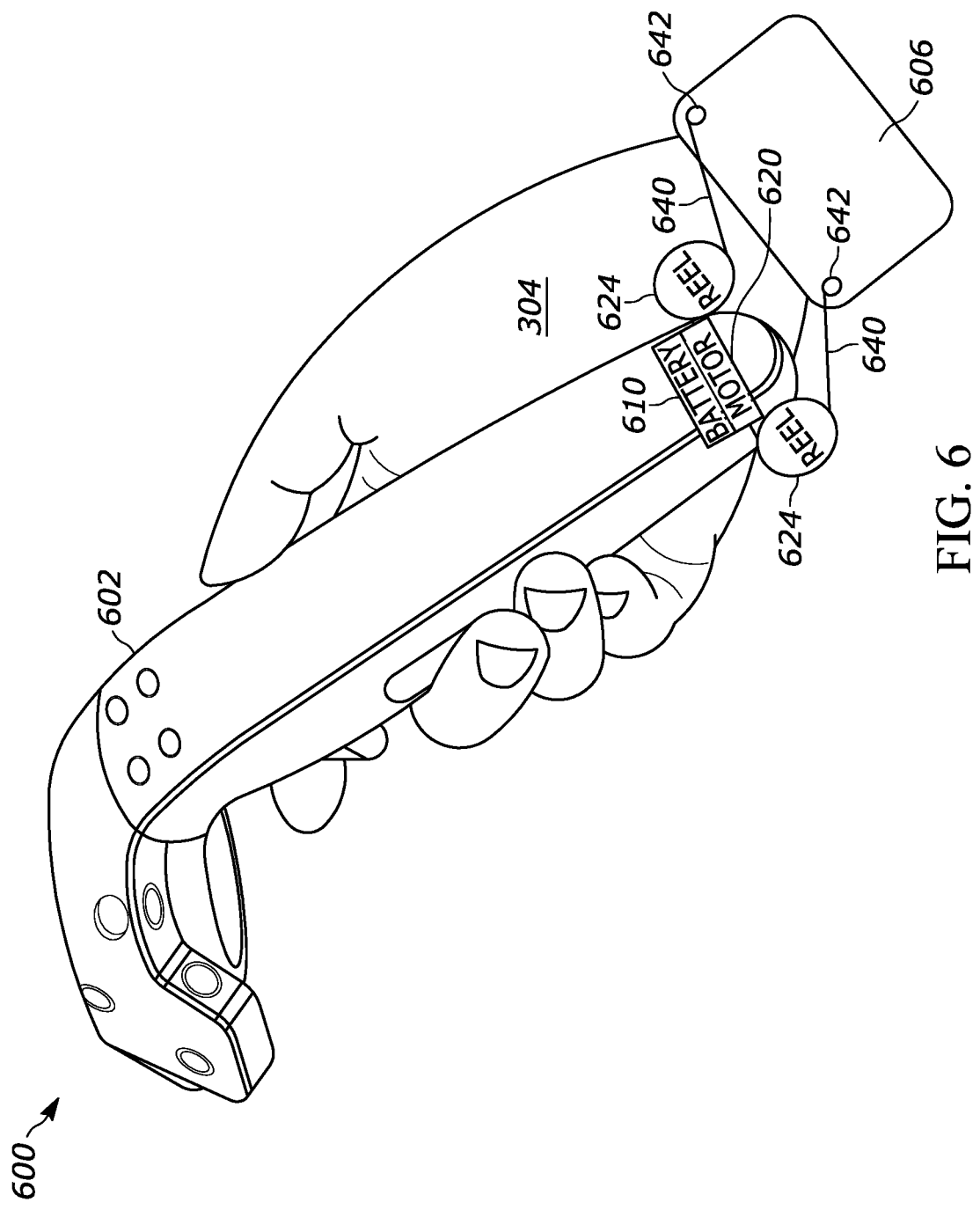

Now describing FIG. 6, another example controller 600 is shown that has both a housing 602 and wrist strap 606. Differentiating the controller 600, respective reels 624 may be located on or toward a distal end of the housing 602 rather than on the wrist strap 606. The reels 624 may be mounted on opposing sides of the housing 602 at or toward the distal end, though other arrangements may also be used. The reels 624 are then connected to the wrist strap 606 at respective anchors 642 via respective connectors 640. Note that the reels 624 may be controlled by a motor 620 as powered by a battery 610.

Figure 7:
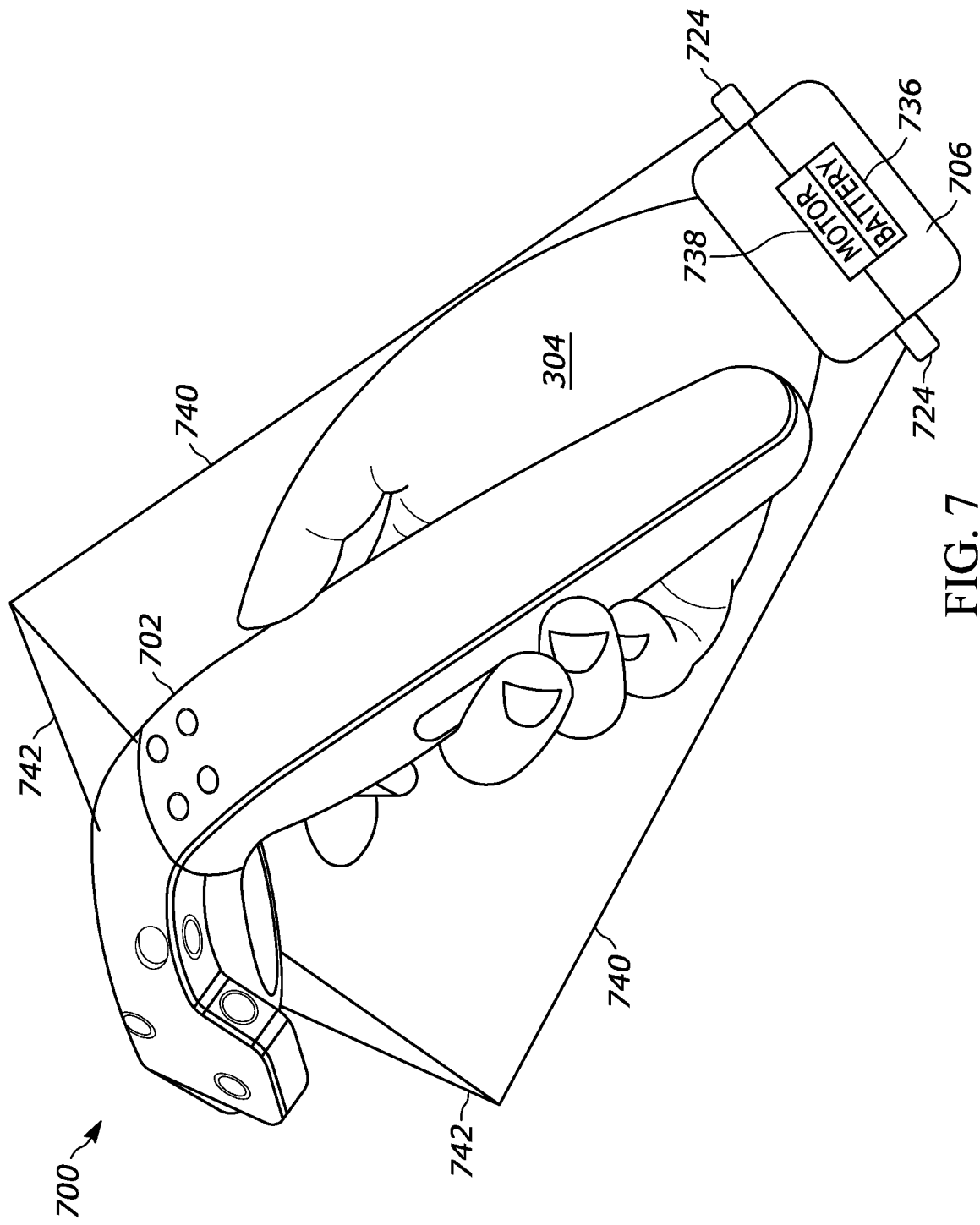

FIG. 7 shows still another example. Here again a controller 700 is shown as having a housing 702 and wrist strap 706. Differentiating the controller 700, rather than having reels, the wrist strap 706 may include respective pistons 724 and respective connectors 740 may be mounted to and extend between respective anchors 742 and pistons 724. Under control of a motor 738 and gears connecting the motor 738 to the pistons 724, the pistons 724 may move back and forth along respective axes that may be defined by the length of the respective connectors 740. Also note that the motor 738 itself may be powered by a battery 736.

Figure 8:
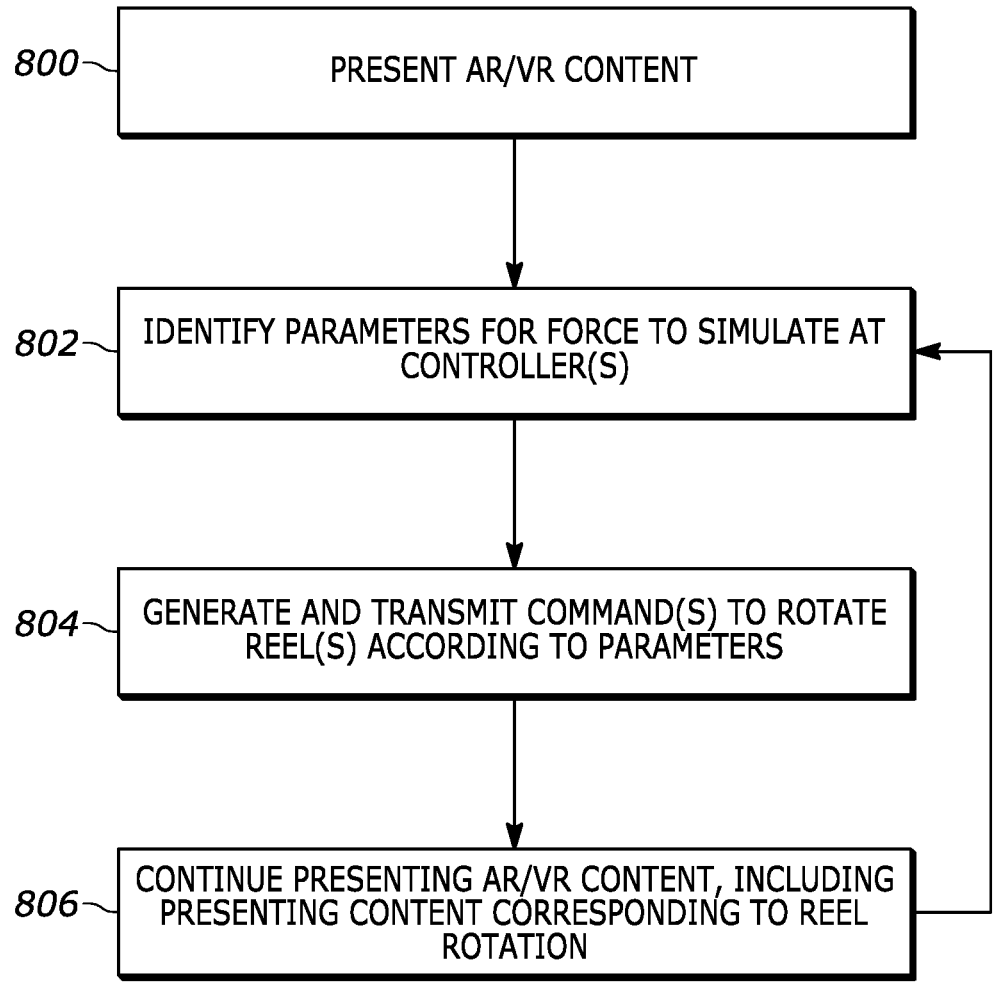
FIG. 8 shows example logic that may be executed by a device to send commands to a controller consistent with present principles.

Continuing the detailed description in reference to FIG. 8, it shows example logic that may be executed by a device such as the system 100 or another computer that is used to present AR or VR content and to send commands to one or more controllers to move their mechanisms to simulate force indicated in the AR content and/or VR content consistent with present principles.

Beginning at block 800, the device may present the AR or VR content itself via presenting AR/VR images on one or more displays and presenting corresponding binaural audio via plural speakers. The logic may then proceed to block 802 where the device may identify one or more parameters for simulating force at one or more controllers, such as any of the controllers described above. The parameters may be determined dynamically when the device maps forces from the AR/VR environment to forces that can be mimicked through the mechanisms of the controller(s). Additionally or alternatively, the parameters may be predefined by the developer or provider of the AR/VR content so that certain predefined moves or actions a user might take when engaging with the AR/VR content correlate to certain parameters for controlling the controller(s). These correlations may be indicated in a relational database stored at a storage location accessible to the device.

Providing some examples, an application programming interface (API) may be used by the device to translate simple collision detection into a push-pull command to either reel on the controller, or to translate gesture commands such as a trigger pull on a virtual gun. For the example of the trigger pull and hence recoil of the virtual gun to be effected, the reel connected to the top part/surface of the controller may jerk/pull the controller quickly back by a short distance to simulate recoil. Another example controller feedback may include the slow pull of the controller by each reel as the user pushes against a virtual wall in the AR/VR content, e.g., to demonstrate Newton's third law of motion.

Thus, once the one or more parameters have been identified at block 802, the logic may proceed to block 804 where the device may generate and transmit one or more commands to the controller(s) to rotate their reels according to the parameters. Furthermore, in some examples at block 804 the device may transmit commands to two different controllers being used by a person, where both controllers might be used to engage with the AR/VR content with two hands. It is to thus be further understood that in such examples, the commands to each controller may in fact be different to simulate different respective forces from the AR/VR content depending on how the user is interacting with the AR/VR content differently with each hand. E.g., the user may be leaning up against a virtual wall with one hand and shooting a virtual gun with another hand, and therefore the reels of the different controllers may be controlled differently but concurrently to simulate these different forces within the AR/VR environment with which the user is engaging.

The logic may then continue to block 806 where the device may continue presenting the AR/VR content, which may include presenting AR/VR images on a display concurrent with the rotating of the reels to correspond to the rotating/winding of the reels themselves. If desired, the logic may then revert back to block 802 and continue therefrom to determine different parameters for commanding the reels of the controller(s) as presentation of the AR/VR content progresses.

Figure 9:
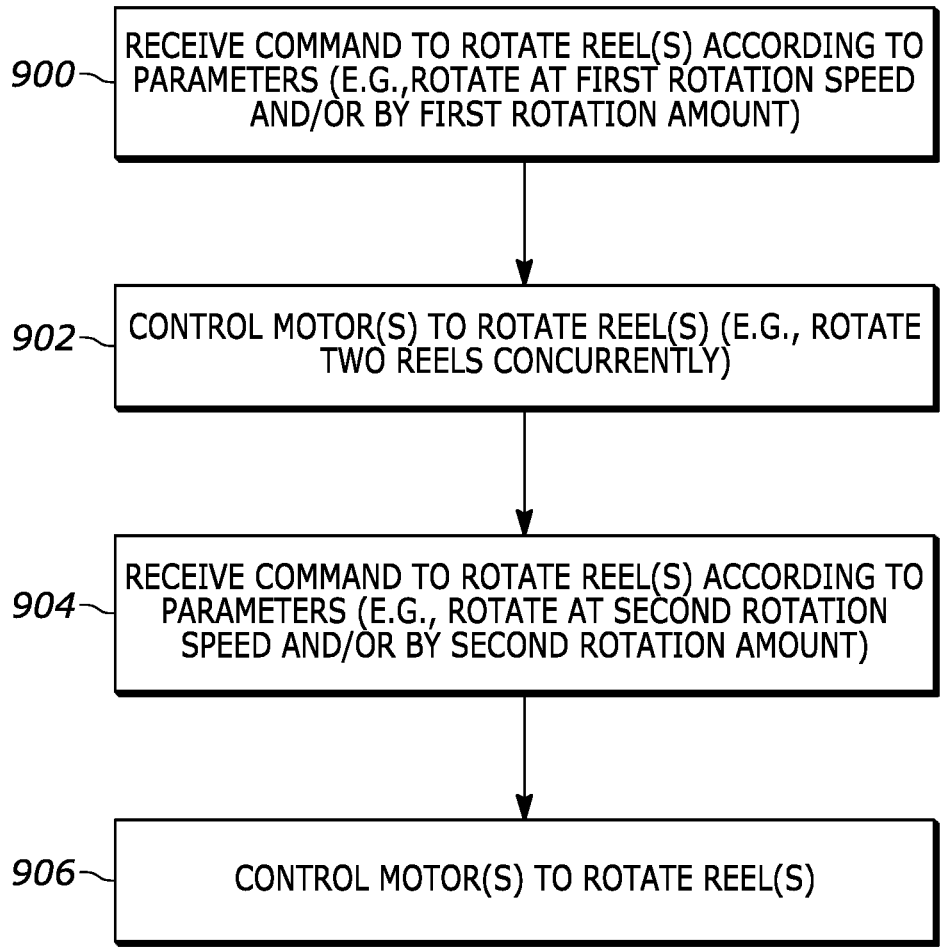
FIG. 9 shows example logic that may be executed by one or more controllers consistent with present principles.

FIG. 9 shows example logic that may be executed by a controller, such as any of the controllers 300, 400, 500, 600, and 700 described above consistent with present principles to move their mechanisms (e.g., reel/motor combinations, piston/motor combinations, etc.) for simulating force indicated in AR/VR content. Beginning at block 900, the controller may receive one or more commands to rotate its reels according to parameters indicated in the commands (or move its other mechanisms, such as the piston/motor combination discussed above in relation to FIG. 7). For example, the parameters may indicate reel rotation at a first rotation speed and/or reel rotation by a first rotation amount to mimic force indicated in the AR/VR content.

The logic may then proceed to block 902 where the controller may, based on receipt of the command(s) received at block 900, control its one or more motors to rotate one or more of its reels at the first speed and/or by the first amount in accordance with the command. For example, the controller may control its motor to rotate two reels concurrently but, e.g., pulling on one connector and allowing slack on the other.

The logic of FIG. 9 may then move to block 904 where the controller may receive another command to rotate its reels according to other parameters. For instance, these additional parameters may indicate reel rotation at a second rotation speed different from the first rotation speed and/or rotation by a second rotation amount different from the first rotation amount to mimic different force indicated in the AR/VR content. The logic may then move to block 906 where the controller may, based on receipt of the command (s) received at block 904, control its one or more motors to rotate one or more of its reels at the second speed and/or by the second amount in accordance with the command. In some examples, the logic may then revert back to block 900 and proceed therefrom to execute still other commands for reel rotation as presentation of the AR/VR content progresses.

It may now be appreciated that present principles provide for improved computer-based user interfaces. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. At least one controller, comprising:
   a housing;
   a wrist strap engageable with the housing;
   at least a first reel engageable with the housing and located on the wrist strap to move the housing relative to the wrist strap while the wrist strap is worn by a person;
   a line coupled to the first reel and coupled to the housing to move the housing relative to the wrist strap while the wrist strap is worn by the person;
   a component through which a portion of the line extends, the portion of the line being between the housing and the wrist strap, the component circumscribing the portion of the line; and
   an anchor that couples the line to a distal end segment of the housing, the anchor comprising a distal apex established by two anchor segments, the line mounted to the anchor at the distal apex, the two anchor segments engaging the housing at respective proximal segments of the anchor segments, the two anchor segments extending away from the housing and toward each other to establish the distal apex.

2. The at least one controller of claim 1, comprising first and second controllers each with a respective housing, a respective wrist strap engageable with the respective housing, and a respective reel engageable with the respective housing and the respective wrist strap to move the respective housing relative to the respective wrist strap while the respective wrist strap is worn by the person.

3. The at least one controller of claim 1, wherein the component comprises an eyelet that circumscribes the portion of the line and that is located between the anchor and the first reel.

4. The at least one controller of claim 3, wherein the eyelet is coupled to a post that extends away from the housing and toward the line, the eyelet located at a distal end of the post.

5. The at least one controller of claim 1, wherein the distal apex and the two anchor segments form one or more of: a V-frame, an A-frame.

6. The at least one controller of claim 1, wherein the anchor is a first anchor, wherein the distal apex is a first distal apex, wherein the distal end segment is a first distal end segment, wherein the two anchor segments are first and second anchor segments, and wherein the at least one controller comprises a second anchor different from the first anchor, the second anchor coupling the line to a second distal end segment of the housing, the second distal end segment of the housing being different from the first distal end segment of the housing, the second anchor comprising a second distal apex established by third and fourth anchor segments, the second distal apex being different from the first distal apex, the third and fourth anchor segments being different from the first and second anchor segments, the line splitting into two segments at a distal portion thereof to mount to the first and second distal apices of the first and second anchors, the third and fourth anchor segments engaging the housing at respective proximal segments of the third and fourth anchor segments, the third and fourth anchor segments extending away from the housing and toward each other to establish the second distal apex.

7. The at least one controller of claim 1, wherein the line is a first line, wherein the at least one controller comprises a second reel different from the first reel, the second reel engageable with the housing and located on the wrist strap to move the housing relative to the wrist strap while the wrist strap is worn by the person, wherein the at least one controller winds the first line using the first reel and concurrently unwinds a second line using the second reel for greater degree of rotation for the housing, the second line being different from the first line.

8. The at least one controller of claim 1, wherein the wrist strap comprises a processor that controls the first reel.

9. The at least one controller of claim 8, wherein the wrist strap comprises a network interface for communicating with another device to receive commands from the other device to control the first reel to move the housing relative to the wrist strap while the wrist strap is worn by the person.

10. The at least one controller of claim 8, wherein the wrist strap comprises a motor that winds the first reel forwards and backwards, and wherein the wrist strap comprises a battery for powering the motor to wind the first reel forwards and backwards.

11. The at least one controller of claim 1, wherein the wrist strap comprises a second reel, third reel, and fourth reel, the first, second, third, and fourth reels being coupled to respective anchors on the housing via respective lines, wherein the first, second, third, and fourth reels are disposed on the wrist strap so that while the wrist strap is worn around a wrist of the person: the first and second reels are disposed along sides of the wrist, the third reel is disposed along a top surface of the wrist, and the fourth reel is disposed along a bottom surface of the wrist.

12. A method, comprising:
providing a housing for a controller;
providing a wrist strap engageable with the housing;
providing at least a first reel engageable with the housing and located on the wrist strap to move the housing relative to the wrist strap while the wrist strap is worn by a person;
providing a line coupled to the first reel and coupled to the housing to move the housing relative to the wrist strap while the wrist strap is worn by the person; and
providing an anchor that couples the line to a distal end segment of the housing, the anchor comprising a distal apex established by two anchor segments, the line mounted to the anchor at the distal apex, the two anchor segments engaging the housing at respective proximal segments of the anchor segments, the two anchor segments extending away from the housing and toward each other to establish the distal apex.

13. A system, comprising:
a controller useful for a person to engage with virtual content, the controller comprising a hand-held housing and a wrist strap, the controller comprising at least one mechanism for simulating force indicated in the virtual content via at least one connector that connects the hand-held housing to the wrist strap, the wrist strap comprising a reel that moves the connector for simulating the force, the connector being coupled to the reel and coupled to the hand-held housing to simulate the force while the wrist strap is worn by the person, the connector coupled to the hand-held housing via an anchor, the anchor comprising a distal apex established by two anchor segments, the connector mounted to the anchor at the distal apex, the two anchor segments engaging the hand-held housing at respective proximal segments of the anchor segments, the two anchor segments extending away from the hand-held housing and toward each other to establish the distal apex.

14. The system of claim 13, comprising a headset that presents the virtual content.

15. The system of claim 14, comprising a device different from the headset and different from the controller, the device facilitating presentation of the virtual content at the headset and facilitating the simulating of force at the controller.

16. The system of claim 15, wherein the device comprises one or more of: a video game console, a personal computer.

17. The system of claim 13, wherein the wrist strap comprises a processor and storage, the processor controlling the reel based on software instructions stored in the storage.

18. The system of claim 17, wherein the wrist strap comprises a motor that winds the reel forwards and backwards, and wherein the wrist strap comprises a battery for powering the motor to wind the reel forwards and backwards.

19. The at least one controller of claim 9, wherein the wrist strap comprises a universal serial bus (USB) port for wired communication with the other device.

20. The at least one controller of claim 19, wherein the wrist strap comprises storage that stores software instructions for operation of the first reel.

\* \* \* \* \*